United States Patent [19]

Cannon

[11] Patent Number: 5,396,660
[45] Date of Patent: Mar. 7, 1995

[54] METHOD AND APPARATUS FOR IMPROVING BATTERY LIFE IN A PORTABLE COMMUNICATION RECEIVER

[75] Inventor: Gregory L. Cannon, Delray Beach, Fla.

[73] Assignee: Motorola, Inc., Schaumburg, Ill.

[21] Appl. No.: 38,753

[22] Filed: Mar. 26, 1993

[51] Int. Cl.6 .............................................. H04B 1/16
[52] U.S. Cl. .................................. 455/343; 455/38.3; 340/825.44
[58] Field of Search ..................... 455/343, 38.1, 38.3, 455/38.2, 89, 32.1; 340/825.44, 311.1; 379/59, 61, 63; 371/5.1, 5.5, 69.1

[56] References Cited

U.S. PATENT DOCUMENTS

| | | |
|---|---|---|
| 4,419,765 | 12/1983 | Wycoff et al. . |
| 4,682,165 | 7/1987 | Davis . |
| 4,759,022 | 7/1988 | Akerberg . |
| 4,766,599 | 8/1988 | Miyazaki ............................ 371/69.1 |
| 4,803,487 | 2/1989 | Willard et al. . |
| 4,835,777 | 5/1989 | DeLuca et al. . |
| 4,845,491 | 7/1989 | Fascenda et al. . |
| 4,956,641 | 9/1990 | Matai et al. . |
| 4,995,099 | 2/1991 | Davis . |
| 5,032,835 | 7/1991 | DeLuca . |
| 5,058,203 | 10/1991 | Inagami ............................... 455/343 |
| 5,168,502 | 12/1992 | Millet . |
| 5,175,874 | 12/1992 | Auchter .............................. 455/343 |
| 5,224,152 | 6/1993 | Harte ................................... 455/343 |

Primary Examiner—Edward F. Urban
Assistant Examiner—Nguyen Vo
Attorney, Agent, or Firm—R. Louis Breeden

[57] ABSTRACT

A method and apparatus for improving battery life in a portable communication receiver (108) for use in a communication system (100) which transmits and retransmits uniquely identified message portions (410) include a processor (208) for reading (516) a stored error count corresponding to a stored identifier (402) that matches a received identifier (402) for a retransmitted message portion (410), and discontinuing (517) thereafter reception and decoding of the retransmitted message portion (410) in response to determining in the reading step (516) that the stored error count is zero.

15 Claims, 5 Drawing Sheets

METHOD AND APPARATUS FOR IMPROVING BATTERY LIFE IN A PORTABLE COMMUNICATION RECEIVER

FIELD OF THE INVENTION

This invention relates in general to communication receivers, and more specifically to a method and apparatus for improving battery life in a portable communication receiver.

BACKGROUND OF THE INVENTION

Techniques for improving the reliability of data transmission to a communication receiver, such as a portable selective call receiver, are well known. Various error-correcting codes, e.g., the Golay and POCSAG codes, have been in use for many years. Another technique for improving the reliability of data transmission is to retransmit the same data two, three, or more times separated in time by a predetermined interval.

While the latter method generally is preferred for applications in which there are periods of reception fading longer than can be corrected solely by the error-correcting code, retransmissions also bring an accompanying problem. The problem occurs because portable communication receivers use battery-saving techniques to conserve power during periods of transmission inactivity in order to extend the battery life. Battery life is an operational feature considered extremely important by many users of portable communication receivers. A system that retransmits the same message multiple times tends to diminish the effectiveness of the battery-saving techniques (thus shortening battery life), because the retransmissions keep "waking up" the battery-saving circuitry of the receiver, thereby repeatedly placing the receiver in a higher power consumption state than would otherwise be the case.

Thus, what is needed is a way of reducing the waste of power that occurs in the conventional battery-saving receiver when operating in a multiple retransmission environment, while retaining the transmission reliability enhancements thereof.

SUMMARY OF THE INVENTION

An aspect of the present invention is a method of improving battery life in a portable communication receiver for use in a communication system which transmits and retransmits identifiers and corresponding message portions, each identifier uniquely identifying a corresponding message portion. The method comprises the steps of commencing reception and decoding of an identifier and a corresponding current message portion to obtain therefrom a received identifier, and comparing the received identifier with stored identifiers received and stored during earlier transmissions, in an attempt to find a match between the received identifier and one of the stored identifiers corresponding to an earlier received message portion. In response to failing to find the match in the comparing step, the method further comprises the step of storing the received identifier, the corresponding current message portion after completing reception thereof, and a corresponding error count computed therefor in accordance with a conventional error-detecting code utilized by the communication system. In response to successfully finding the match in the comparing step, the method further comprises the step of reading a stored error count computed for the earlier received message portion in accordance with the conventional error detecting code and stored when the earlier received message portion was received. The earlier received message portion corresponds to the one of the stored identifiers that matches the received identifier. Also in response to successfully finding the match in the comparing step, the method comprises the steps of discontinuing reception and decoding of the current message portion in response to determining in the reading step that the stored error count is zero, and maintaining the reception and decoding of the current message portion in response to determining in the reading step that the stored error count is not zero.

Another aspect of the present invention is an apparatus for improving battery life in a portable communication receiver for use in a communication system which transmits and retransmits identifiers and corresponding message portions, each identifier uniquely identifying a corresponding message portion. The apparatus comprises a receiver-decoder element for commencing reception and decoding of an identifier and a corresponding current message portion to obtain therefrom a received identifier, and a processor element coupled to the receiver-decoder element for comparing the received identifier with stored identifiers received and stored in a memory element during earlier transmissions, in an attempt to find a match between the received identifier and one of the stored identifiers corresponding to an earlier received message portion. The apparatus further comprises the memory element coupled to the processor element for storing the received identifier, the corresponding current message portion, and a corresponding error count computed therefor by the processor element in accordance with a conventional error-detecting code utilized by the communication system, in response to failing to find the match. The apparatus also includes a reader element coupled to the processor element for reading from the memory element a stored error count computed for the earlier received message portion in accordance with the conventional error detecting code and stored when the earlier received message portion was received, the earlier received message portion corresponding to the one of the stored identifiers that matches the received identifier, in response to successfully finding the match. In addition, the apparatus includes a discontinuation element coupled to the reader element for discontinuing reception and decoding of the current message portion in response to the reader element indicating that the stored error count is zero, and an element, coupled to the reader element, for continuing the reception and decoding of the current message portion in response to the reader element indicating that the stored error count is non-zero.

Another aspect of the present invention is a portable communication receiver for use in a communication system which transmits and retransmits identifiers and corresponding message portions, each identifier uniquely identifying a corresponding message portion. The portable communication receiver comprises a receiver element for receiving radio signals comprising an identifier and a corresponding current message portion to obtain therefrom a received identifier, and a decoder coupled to the receiver element for decoding the current message portion and the received identifier. The portable communication receiver further comprises a battery coupled to the portable communication receiver for powering the portable communication receiver, and an apparatus coupled to the battery for improving life of the battery in the portable communication receiver. The apparatus comprises a processor coupled to the decoder for comparing the received identifier with stored identifiers received and stored during earlier transmissions, in an attempt to find a match between the received identifier and one of the stored identifiers corresponding to an earlier received message portion. The apparatus further comprises a memory coupled to the processor for storing the received identifier, the corresponding current message portion, and a corresponding error count computed therefor by the processor in accordance with a conventional error-detecting code utilized by the communication system, in response to failing to find the match. The apparatus also includes a reader element coupled to the processor for reading from the memory a stored error count computed for the earlier received message portion by the processor in accordance with the conventional error detecting code and stored when the earlier received message portion was received, the earlier received message portion corresponding to the one of the stored identifiers that matches the received identifier, in response to successfully finding the match. In addition, the apparatus includes a discontinuation element coupled to the reader element for discontinuing reception and decoding of the current message portion in response to the reader element determining that the stored error count is zero, and an element, coupled to the reader element, for continuing the reception and decoding of the current message portion in response to the reader element determining that the stored error count is non-zero.

DESCRIPTION OF THE PREFERRED EMBODIMENT

Figure 1:
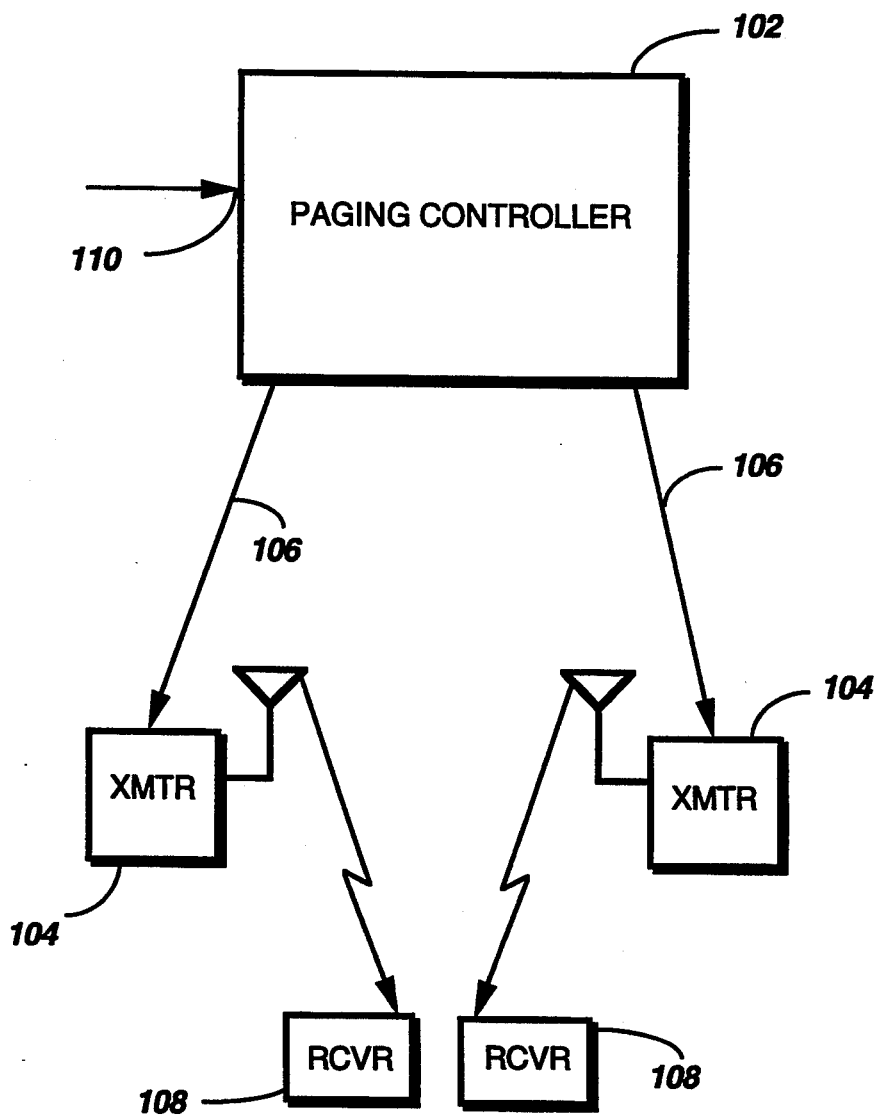
FIG. 1 is an electrical block diagram of a communication system in accordance with the preferred embodiment of the present invention.

Referring to FIG. 1, an electrical block diagram of a communication system 100 in accordance with the preferred embodiment of the present invention comprises a paging controller 102 for formatting selective call messages and controlling the transmission thereof. The paging controller 102 comprises a telephone input 110 for receiving calls directed to individual selective call receivers in a manner well known in the art. The paging controller 102 is coupled by at least one line 106 to at least one paging transmitter 104 for transmitting the selective call messages by radio communications to at least one selective call receiver 108. Preferably, the paging controller 102 is similar to a model E09-PED0552 PageBridge ® paging terminal, the paging transmitter 104 is similar to a model C73 PURC 5000 ® transmitter, and the selective call receiver 108 is similar to a model A03KLB5962CA ADVISOR ® pager, all manufactured by Motorola, Inc. of Schaumburg, Ill. It will be appreciated that other functionally equivalent equipment may be used as well to construct the communication system 100.

During operation, when the paging controller 102 receives a paging message at the telephone input 110, the paging controller 102 formats and sends a paging data signal comprising one or more uniquely identified portions of the message to the paging transmitter 104 for radio transmission to the selective call receiver 108. To increase the reliability of page reception the paging controller 102 retransmits the uniquely identified message portions several times. The selective call receiver 108 then compares the retransmitted identified message portions, replacing message portions having errors with corresponding message portions having fewer or no errors, as will be described herein below.

Figure 2:
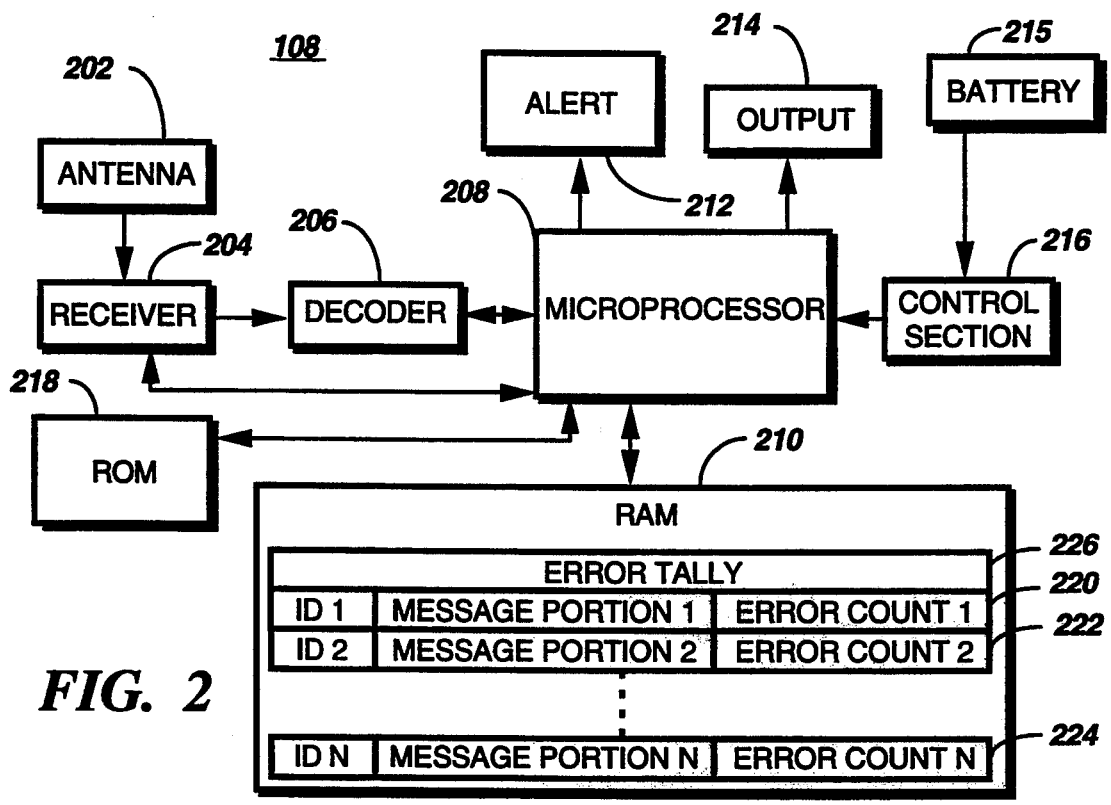
FIG. 2 is an electrical block diagram of a selective call receiver in accordance with the preferred embodiment of the present invention.

Referring to FIG. 2, an electrical block diagram of the selective call receiver 108 in accordance with the preferred embodiment of the present invention comprises an antenna 202 for intercepting RF signals. The antenna 202 is coupled to a receiver 204 for receiving and demodulating the RF signals intercepted. A decoder 206 is coupled to the receiver 204 for decoding a demodulated address transmitted in any of a number of well-known signaling protocols, such as POCSAG or GSC selective call signaling. A microprocessor 208, e.g., the MC68HC05C8 or C11 series microcomputers manufactured by Motorola, Inc. of Schaumburg, Ill., is also coupled to the receiver 204 for processing the demodulated information. The microprocessor 208 is responsive to the decoder 206 and is coupled to a random access memory (RAM) 210 for storing recovered information having an address assigned to the selective call receiver 108. The RAM 210 comprises message locations 220, 222, 224 for storing received message portions and message portion IDs, along with a calculated error count for each received message portion. The RAM 210 further comprises an error tally location 226 for storing a running tally of errors in a message portion. An alert generator 212 is coupled to the microprocessor 208 for providing an audible or tactile alert to a user when the microprocessor 208 has a complete message ready for presentation.

An output device 214 comprises a visual display or an audio transducer or both, the output device 214 also being controlled by the microprocessor 208. A control section 216 comprises user accessible controls for allowing the user to command the microprocessor 208 to perform the selective call receiver operations well known to one of ordinary skill in the art, and typically includes control switches such as an on/off control button, a function control, etc. A battery 215 is coupled through the control section 216 for supplying power to the selective call receiver 108.

The microprocessor 208 is coupled to a read-only memory (ROM) 218 comprising special processor elements, i.e., firmware elements, in accordance with the preferred embodiment of the present invention. The firmware elements are described herein below in the discussion of FIGS. 3 and 8. It will be appreciated that the functions of the decoder 206, the RAM 210, and the ROM 218 may be incorporated into the microprocessor 208 as well, as contiguous components thereof. It will be further appreciated that other types of non-volatile memory, e.g., programmable read-only memory (PROM) and electrically-erasable programmable read-only memory (EEPROM), may be used as well for the ROM 218.

Figure 3:
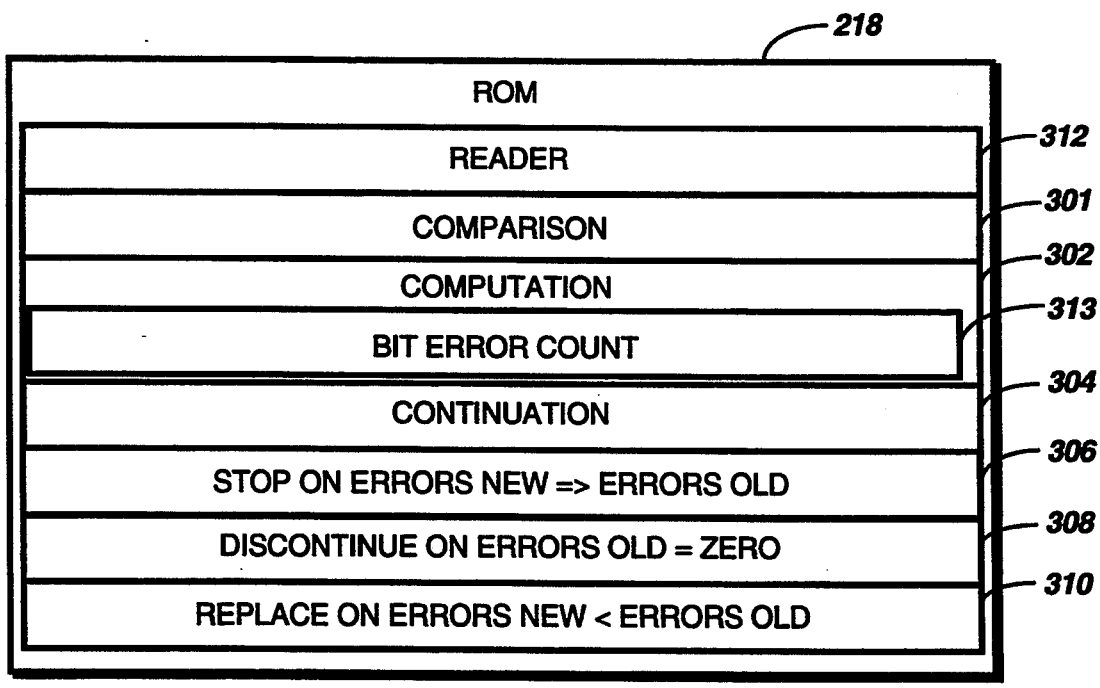
FIG. 3 is a firmware diagram depicting firmware elements of a selective call receiver in accordance with the preferred embodiment of the present invention.

Referring to FIG. 3, a firmware diagram 300 depicts firmware elements pre-programmed into the ROM 218 of the selective call receiver 108 in accordance with the preferred embodiment of the present invention and comprising a reader element 312. The reader element 312 is for reading a stored error count for a stored message portion identifier corresponding to a received identifier. The firmware elements further comprise a comparison element 301. The comparison element 301 compares a running tally of errors computed by the microprocessor 208 for a retransmitted message portion with the error count computed and stored earlier in the RAM 210 for the corresponding message portion, as identified by the message ID. The firmware elements further comprise a computation element 302 for computing the running tally while the retransmitted message portion is being received. The computation element comprises a bit error count element 313 for comparing data bits and parity bits of an error-correcting and error-detecting data block, e.g., the well-known POCSAG data block, to determine the number of uncorrectable errors in the data block.

The firmware elements also include a continuation element 304 for controlling the selective call receiver 108 to continue receiving and decoding a retransmitted message portion in response to the current running error tally being less than the error count corresponding to the same message portion stored earlier. The firmware elements further include a stop element 306 for terminating reception and decoding of a retransmitted message portion if the message portion is found to contain an error count equal to or greater than that of a corresponding earlier stored message portion. The firmware elements also include a discontinuation element 308 for terminating reception and decoding of a retransmitted message portion if the error count of the previously stored message portion is zero. The firmware elements still further comprise a replacement element 310 for replacing a stored message portion with a retransmitted message portion if the error count of the retransmitted message portion is less than that of the stored message portion. Operation of the firmware elements is described additionally herein below in reference to FIGS. 5 and 6.

Figure 4:
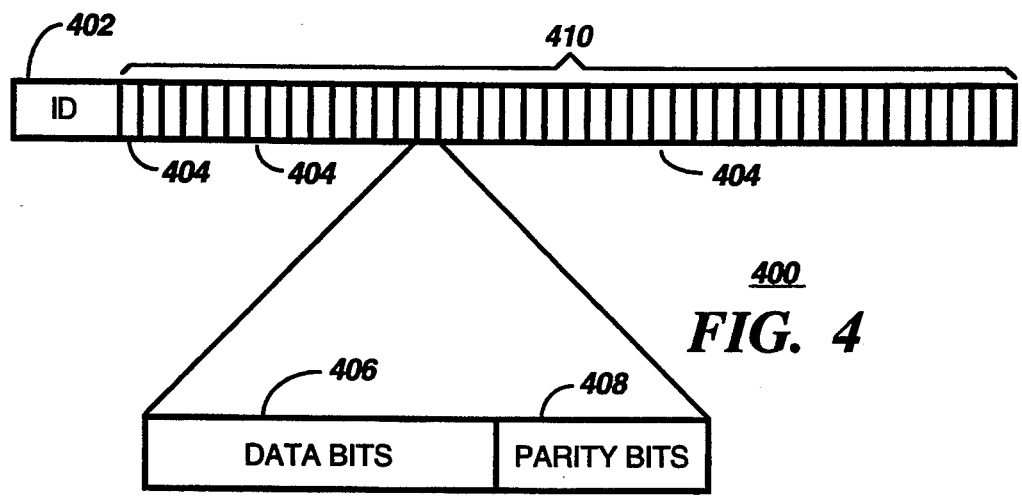
FIG. 4 is a diagram depicting the structure of an identified message portion comprising an error-correcting code in accordance with the preferred embodiment of the present invention.

Referring to FIG. 4, a diagram 400 depicts the structure of a message portion 410 comprising an error-correcting code in accordance with the preferred embodiment of the present invention. The diagram 400 also includes a message portion ID 402 uniquely identifying the message portion 410, and further depicts a plurality of data blocks 404 that form the message portion 410. A data block 404 comprises a plurality of data bits 406 forming message characters, and a plurality of parity bits 408 for detecting and correcting errors in the data bits 406. The selective call receiver 108 processes each data block 404 as the data block 404 is received to compute a running tally of uncorrectable errors in the message portion 410. Computing the running tally advantageously allows control of the selective call receiver 108 for conserving battery power immediately upon discovering that a retransmitted message portion 410 has no fewer errors than a corresponding message portion 410 received and stored earlier.

Figure 5:
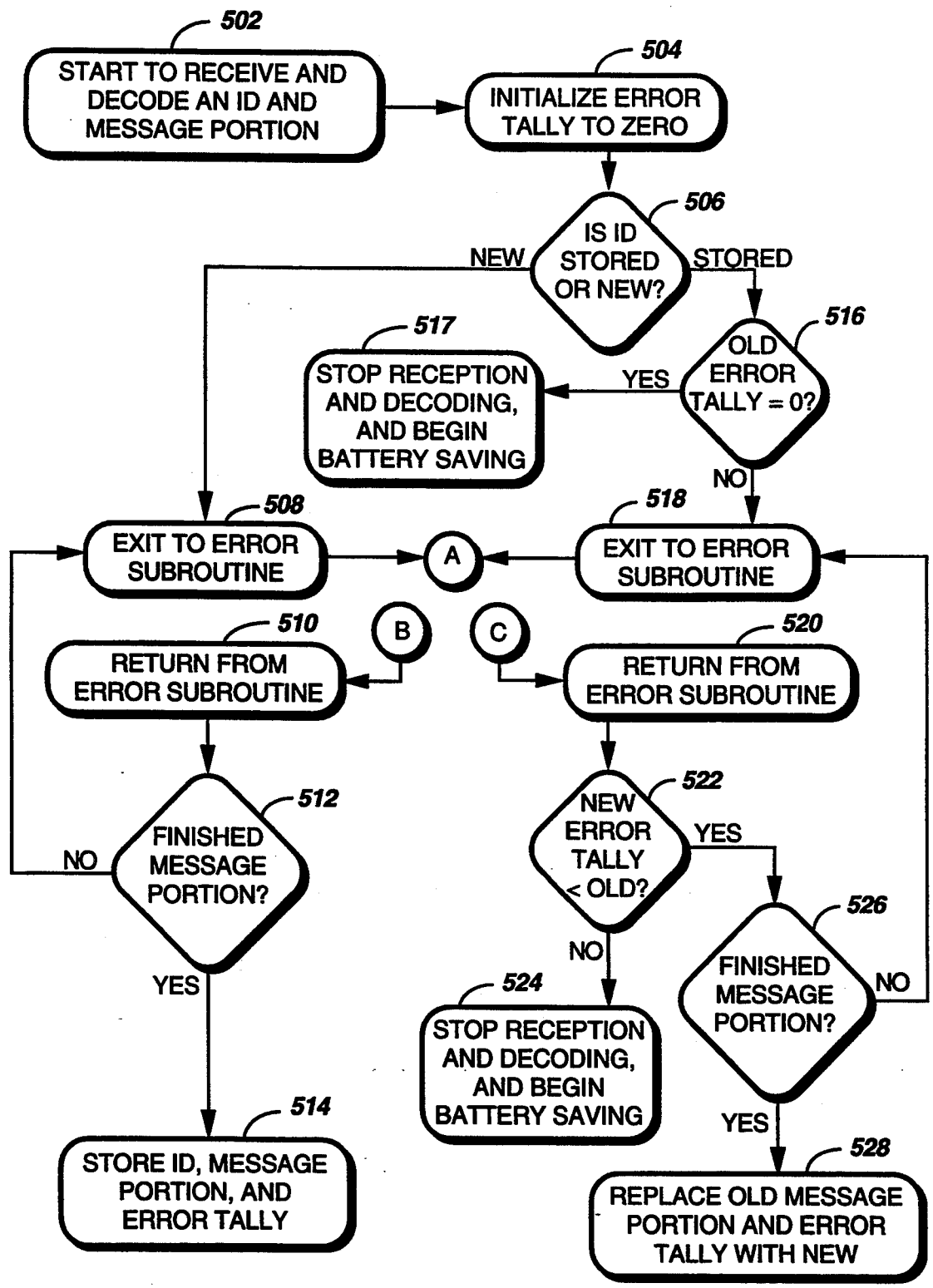
FIG. 5 is a flow chart depicting the operation of the selective call receiver in accordance with the preferred embodiment of the present invention.

Referring to FIG. 5, a flow chart 500 depicting the operation of the selective call receiver 108 in accordance with the preferred embodiment of the present invention begins with the microprocessor 208 of the selective call receiver 108 "awakening" the selective call receiver 108 from its battery-saving mode to begin 502 to receive and decode a message portion ID 402 and the associated message portion 410. In response, the microprocessor 208 of the selective call receiver 108 initializes 504 the error tally in the error tally location 226 of the RAM 210 to zero. Next, the microprocessor 208 accesses the reader element 312 to check 506 the stored IDs in the message locations 220, 222, 224 of the RAM 210 to determine whether the ID 402 just received matches a stored ID 402, or is a new ID 402. If the ID 402 is new, flow moves to step 508, and exits to an error subroutine 600 (FIG. 6) for calculating an error tally for a next block of data, as described herein below. When flow returns from the error subroutine 600 at step 510, the microprocessor 208 then checks whether all data blocks of the message portion 410 have been evaluated. If not, flow returns to step 508 to again exit to the error subroutine 600. If, on the other hand, in step 512 the microprocessor 208 determines that all data blocks of the message portion 410 have been evaluated, then the microprocessor 208 stores 514 the message portion ID 402, the associated message portion 410, and the error tally in one of the message locations 220, 222, 224.

If, on the other hand, in step 506 the just-received ID 402 matches a stored ID 402, flow moves to step 516, where the microprocessor 208 accesses the discontinuation element 308 to check 516 whether the stored error tally corresponding to the message portion ID 402 equals zero, i.e., there are no errors in the stored message portion 410. If so, the stored message portion 410 cannot be improved upon, and the microprocessor 208 immediately stops 517 reception and decoding of any further message blocks of the message portion 410 and begins battery saving operation, waiting for a next message portion 410 to begin. If, however, in step 516 the microprocessor 208 determines that the stored error tally is not zero, then the microprocessor 208 exits 518 to the error subroutine 600 (FIG. 6) for calculating an error tally for a next block of data. When flow returns from the error subroutine 600 at step 520, the microprocessor 208 accesses the comparison element 301 to compare 622 the current error tally with the stored error tally to determine whether the current error tally is less than the stored error tally. If not, the new message portion 410 has at least as many errors as the old message portion 410, and the microprocessor 208 immediately accesses the stop element 306 to stop 524 reception and decoding of any further message blocks of the message portion 410 and to begin battery saving operation, waiting for a next message portion 410 to arrive.

If, on the other hand, in step 522 the microprocessor 208 determines that the current error tally is less than the stored error tally, then the microprocessor 208 accesses the continuation element 304 to continue to receive and decode the retransmitted message after checking 526 whether all data blocks of the message portion 410 have been evaluated. If all data blocks have not been evaluated, flow returns to step 518 to exit to the error subroutine 600 to evaluate the next data block. If, however, all data blocks have been evaluated, then the microprocessor 208 accesses the replacement element 310 to replace 528 the stored message portion 410 and error tally with the just-received message portion 410 and the currently calculated error tally. In this manner, the selective call receiver 108 in accordance with the preferred embodiment of the present invention advantageously exploits the transmission reliability enhancements provided by the retransmitted message portions 410. Simultaneously with enjoying the enhanced transmission reliability, the selective call receiver 108 minimizes resultant adverse effects on battery life by immediately returning to battery saving operation when it is determined that an incoming retransmitted message portion 410 has no fewer errors than a corresponding message portion 410 received and stored earlier.

Figure 6:
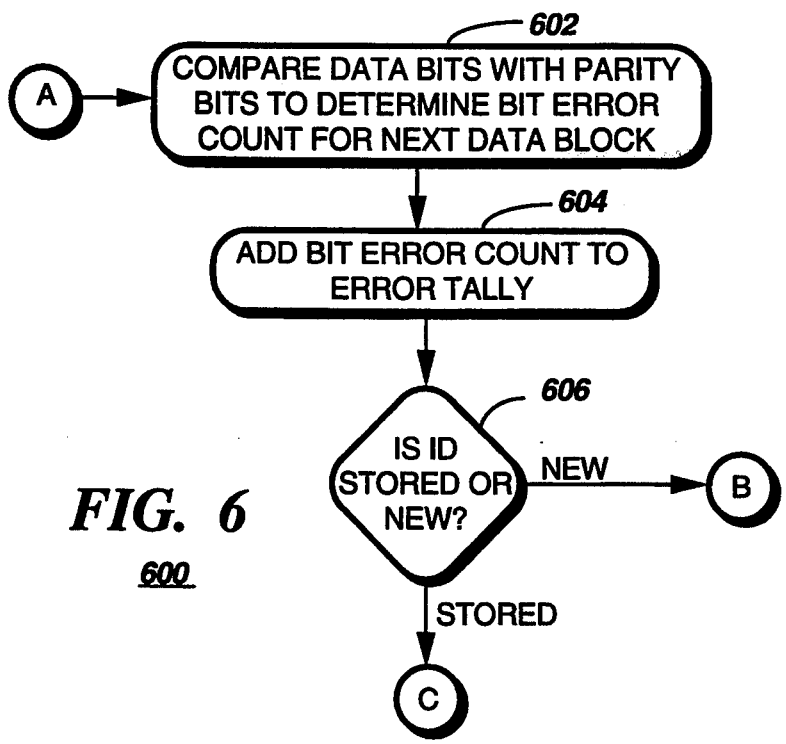
FIG. 6 is a flow chart depicting the operation of an error subroutine in accordance with the preferred embodiment of the present invention.

Referring to FIG. 6, a flow chart depicting the operation of the error subroutine 600 in accordance with the preferred embodiment of the present invention begins with the microprocessor 208 accessing the computation element 302 comprising the bit error count element 313 to compare 602 the data bits 406 and the parity bits 408 of a next data block 404 to determine the number of uncorrectable errors in the data block 404. The microprocessor 208 then adds 604 the bit error count to the error tally stored in the error tally location 226 of the RAM 210. Then in step 606 the microprocessor 208 determines whether the ID 402 matches a stored ID 402, or is new. If new, flow returns to step 510 of the flow chart 500 (FIG. 5). If stored, flow returns to step 520 of the flow chart 500.

For the case of the alternative embodiment of the present invention described herein below, all references to the error subroutine 600 in the flow chart 500 (FIG. 5) are replaced by references to an error subroutine 900 in accordance with the alternative embodiment. The subroutine 900 is described herein below regarding FIG. 9.

Figure 7:
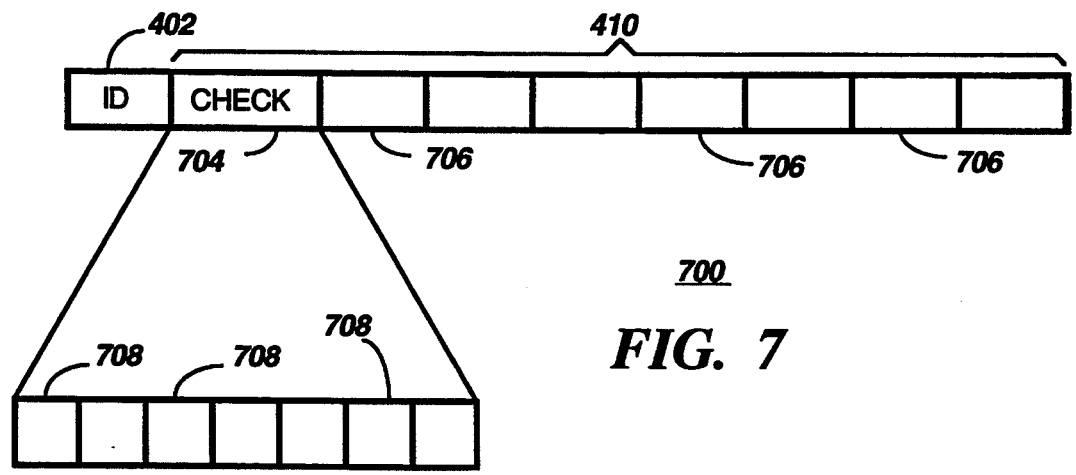
FIG. 7 is a diagram depicting the structure of an identified message portion comprising an error-detecting code in accordance with an alternative embodiment of the present invention.

Referring to FIG. 7, a diagram 700 depicts the structure of a message portion 410 comprising an error-detecting code in accordance with an alternative embodiment of the present invention. The diagram 700 further depicts the message identifier 402, a checksum block 704, and a plurality of data blocks 706 comprising data bits. The checksum block 704 includes a plurality of partial checksums 708, each partial checksum 708 corresponding uniquely to one of the plurality of data blocks 706. By comparing a partial checksum 708 with a corresponding data block 706, it is possible to determine whether the data block 706 contains errors.

Figure 8:
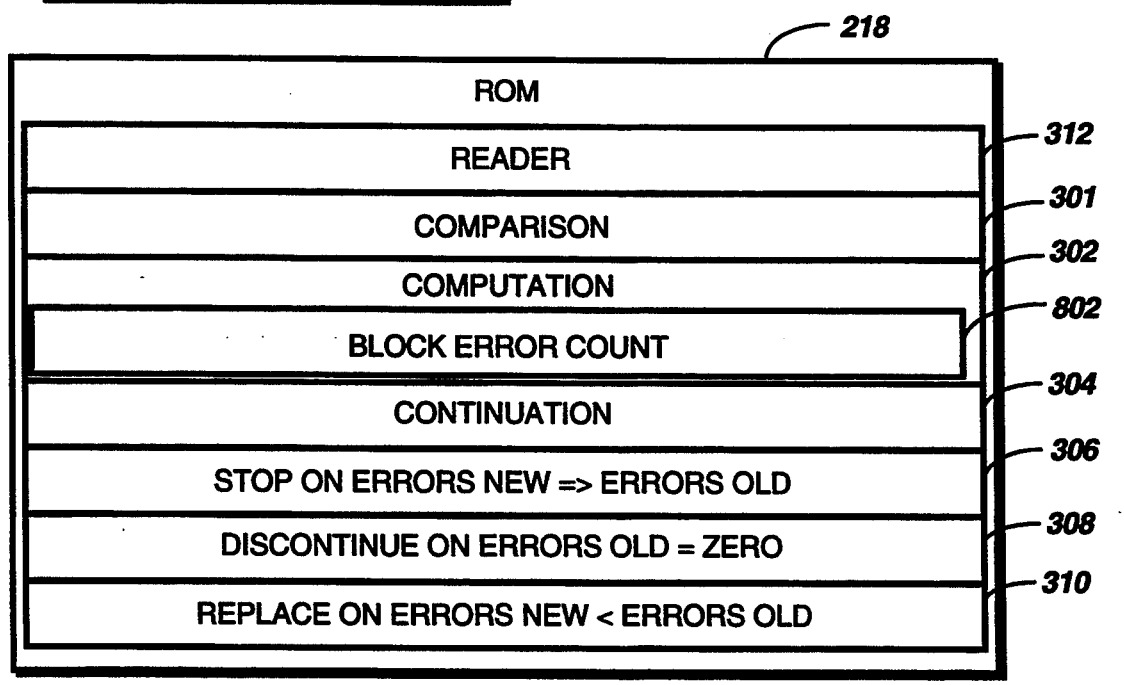
FIG. 8 is a firmware diagram depicting firmware elements of a selective call receiver in accordance with the alternative embodiment of the present invention.

With reference to FIG. 8, a firmware diagram 800 depicts firmware elements of the selective call receiver 108 in accordance with the alternative embodiment of the present invention. The essential difference between the firmware diagram 800 and the firmware diagram 300 (FIG. 3) is the replacement of the bit error count element 313 of the firmware diagram 300 by the block error count element 802 of the firmware diagram 800. The function of the block error count element 802 is to process message portions 410 of the structure shown in the diagram 700 to determine whether a data block 706 contains an error.

Figure 9:
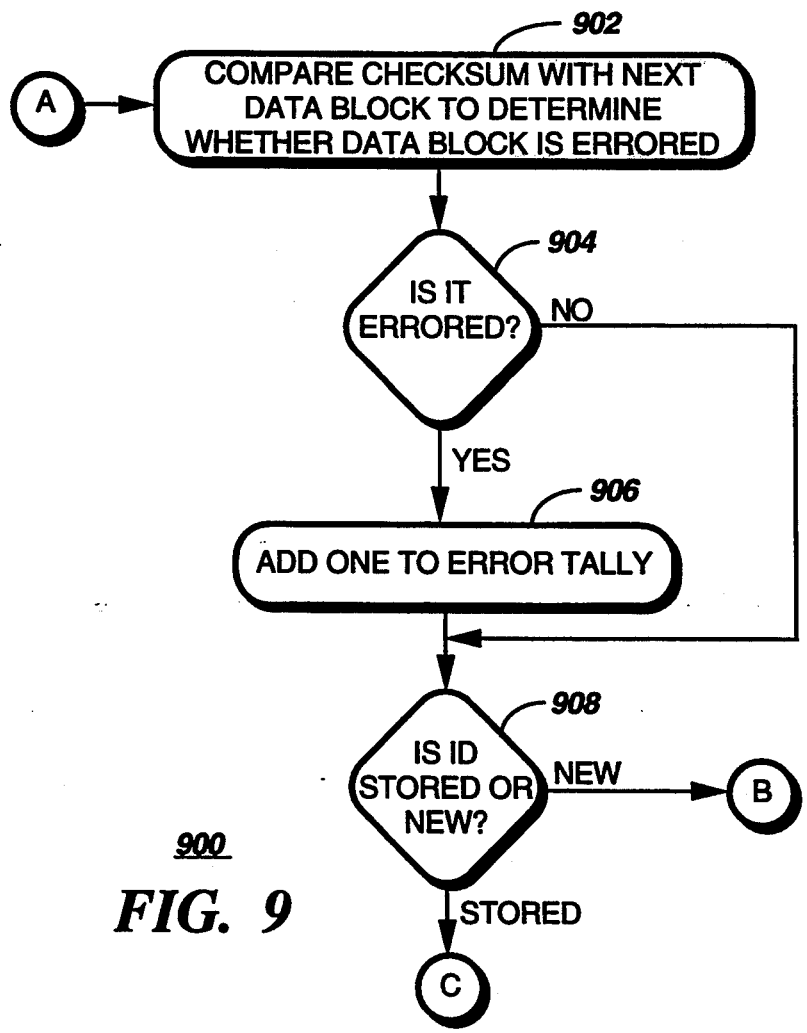
FIG. 9 is a flow chart depicting the operation of an error subroutine in accordance with the alternative embodiment of the present invention.

With reference to FIG. 9, a flow chart depicts the operation of the error subroutine 900 in accordance with the alternative embodiment of the present invention. First, the microprocessor 208 accesses the computation element 302 comprising the block error count element 802 to compare 902 a partial checksum 708 with the corresponding next data block 706 to determine whether the data block 706 is errored. If not, in step 904 flow moves to step 908, described herein below. If, however, the data block 706 is errored, then in step 906 the microprocessor 208 adds one to the error tally, and then moves to step 908. In step 908 the microprocessor 208 determines whether the ID 402 matches a stored ID 402, or is new. If new, flow returns to step 510 of the flow chart 500 (FIG. 5). If stored, flow returns to step 520 of the flow chart 500.

Thus, the preferred embodiment of the present invention exploits the transmission reliability enhancements provided by retransmission of message portions, while advantageously minimizing resultant adverse effects on battery life. Battery consumption is markedly reduced by returning substantially immediately to battery saving operation when it is determined that an incoming retransmitted message portion is not useful because the message portion has no fewer errors than a corresponding message portion received and stored earlier.

What is claimed is:

1. A method of improving battery life in a portable communication receiver for use in a communication system which transmits and retransmits identifiers and corresponding message portions, each identifier uniquely identifying a corresponding message portion, the method comprising the steps of:

commencing reception and decoding of an identifier and a corresponding current message portion to obtain therefrom a received identifier;

comparing the received identifier with stored identifiers received and stored during earlier transmissions, in an attempt to find a match between the received identifier and one of the stored identifiers corresponding to an earlier received message portion; and in response to failing to find the match in said comparing step:

storing the received identifier, the corresponding current message portion after completing reception thereof, and a corresponding error count computed therefor in accordance with a conventional error-detecting code utilized by the communication system; and in response to successfully finding the match in said comparing step:

reading a stored error count computed for the earlier received message portion in accordance with the conventional error detecting code and stored when the earlier received message portion was received, the earlier received message portion corresponding to the one of the stored identifiers that matches the received identifier;

discontinuing reception and decoding of the current message portion in response to determining in said reading step that the stored error count is zero; and maintaining the reception and decoding of the current message portion in response to determining in said reading step that the stored error count is not zero.

2. The method of claim 1, wherein the message portion includes a plurality of data blocks comprising data bits transmitted in accordance with the conventional error-detecting code utilized by the communication system, and wherein the maintaining step comprises the steps of:

computing a running tally of errors in the data blocks of the current message portion as the data blocks of the current message portion are being received and decoded, wherein the errors are detected in accordance with the error-detecting code utilized by the communication system;

comparing concurrently with said computing step the running tally with the stored error count;

continuing the reception and decoding of additional data blocks of the current message portion in response to determining in said comparing step that the running tally is less than the stored error count; and stopping the reception and decoding of the additional data blocks of the current message portion in response to determining in said comparing step that the running tally has become equal to or greater than the stored error count.

3. The method of claim 2, further comprising the step of replacing the earlier received message portion corresponding to the one of the stored identifiers matching the received identifier, with the current message portion in response to determining in said comparing step that the running tally for the current message portion in entirety is less than the stored error count.

4. The method of claim 2, wherein each of the data blocks contains data bits and parity bits, and wherein said computing step comprises the step of determining from the data bits and the parity bits of a data block a count of data bit errors in the data block.

5. The method of claim 2, wherein the message portion includes a plurality of partial checksums, each partial checksum corresponding uniquely to one of the data blocks, and wherein each partial checksum is compared to the data bits of the corresponding data block in accordance with the conventional error-detecting code utilized by the communication system to determine whether the data block contains errors, and wherein said computing step comprises the step of determining whether a data block is errored by comparing the data bits of the data block with the corresponding partial checksum.

6. Apparatus for improving battery life in a portable communication receiver for use in a communication system which transmits and retransmits identifiers and corresponding message portions, each identifier uniquely identifying a corresponding message portion, the apparatus comprising:

receiver-decoder means for commencing reception and decoding of an identifier and a corresponding current message portion to obtain therefrom a received identifier;

processor means coupled to the receiver-decoder means for comparing the received identifier with stored identifiers received and stored in a memory means during earlier transmissions, in an attempt to find a match between the received identifier and one of the stored identifiers corresponding to an earlier received message portion;

the memory means coupled to the processor means for storing the received identifier, the corresponding current message portion, and a corresponding error count computed therefor by the processor means in accordance with a conventional error-detecting code utilized by the communication system, in response to failing to find the match;

reader means coupled to the processor means for reading from the memory means a stored error count computed for the earlier received message portion in accordance with the conventional error detecting code and stored when the earlier received message portion was received, the earlier received message portion corresponding to the one of the stored identifiers that matches the received identifier, in response to successfully finding the match; and discontinuation means coupled to said reader means for discontinuing reception and decoding of the current message portion in response to the reader means indicating that the stored error count is zero, and means, coupled to said reader means, for continuing the reception and decoding of the current message portion in response to the reader means indicating that the stored error count is non-zero.

7. The apparatus of claim 6, wherein the message portion includes a plurality of data blocks comprising data bits transmitted in accordance with the conventional error-detecting code utilized by the communication system, and wherein the means for continuing the reception and decoding of the current message portion comprises:

computation means coupled to said reader means for computing a running tally of errors in the data blocks of the current message portion as the data blocks of the current message portion are being received and decoded, wherein the errors are detected in accordance with the error-detecting code utilized by the communication system;

comparison means coupled to said computation means for comparing the running tally with the stored error count as said computation means computes the running tally;

continuation means coupled to said comparison means for continuing the reception and decoding of additional data blocks of the current message portion in response to the running tally being less than the stored error count; and stop means coupled to said comparison means for stopping the reception and decoding of the additional data blocks of the current message portion in response to the running tally becoming equal to or greater than the stored error count.

8. The apparatus of claim 7, further comprising replacement means coupled to said comparison means for replacing the earlier received message portion corresponding to the one of the stored identifiers matching the received identifier, with the current message portion in response to the running tally for the current message portion in entirety being less than the stored error count.

9. The apparatus of claim 7,
wherein each of the data blocks contains data bits and parity bits, and
wherein said computation means comprises bit error count means for determining from the data bits and the parity bits of each of the data blocks a count of data bit errors in the data block.

10. The apparatus of claim 7,
wherein the message portion includes a plurality of partial checksums, each partial checksum corresponding uniquely to one of the data blocks, and
wherein each partial checksum is compared to the data bits of the corresponding data block in accordance with the conventional error-detecting code utilized by the communication system to determine whether the data block contains errors, and
wherein said computation means comprises block error count means for determining whether each of the data blocks is errored by comparing the data bits of the data block with the corresponding partial checksum.

11. A portable communication receiver for use in a communication system which transmits and retransmits identifiers and corresponding message portions, each identifier uniquely identifying a corresponding message portion, the portable communication receiver comprising:
a receiver element for receiving radio signals comprising an identifier and a corresponding current message portion to obtain therefrom a received identifier;
a decoder coupled to said receiver element for decoding the current message portion and the received identifier;
a battery coupled to the portable communication receiver for powering the portable communication receiver; and
apparatus coupled to said battery for improving life of said battery in the portable communication receiver, said apparatus comprising:
a processor coupled to said decoder for comparing the received identifier with stored identifiers received and stored during earlier transmissions, in an attempt to find a match between the received identifier and one of the stored identifiers corresponding to an earlier received message portion;
a memory coupled to said processor for storing the received identifier, the corresponding current message portion, and a corresponding error count computed therefor by the processor in accordance with a conventional error-detecting code utilized by the communication system, in response to failing to find the match;
a reader element coupled to said processor for reading from said memory a stored error count computed for the earlier received message portion by said processor in accordance with the conventional error detecting code and stored when the earlier received message portion was received, the earlier received message portion corresponding to the one of the stored identifiers that matches the received identifier, in response to successfully finding the match; and
a discontinuation element coupled to said reader element for discontinuing reception and decoding of the current message portion in response to the reader element determining that the stored error count is zero;
elements, coupled to said reader element, for continuing the reception and decoding of the current message portion in response to the reader element determining that the stored error count is non-zero.

12. The portable communication receiver of claim 11,
wherein the message portion includes a plurality of data blocks comprising data bits transmitted in accordance with the conventional error-detecting code utilized by the communication system, and
wherein the elements for continuing the reception and decoding of the current message portion comprise:
a computation element coupled to said reader element for computing a running tally of errors in the data blocks of the current message portion as the data blocks of the current message portion are being received and decoded, wherein the errors are detected in accordance with the error-detecting code utilized by the communication system;
a comparison element coupled to said computation element for comparing the running tally with the stored error count as said computation element computes the running tally;
a continuation element coupled to said comparison element for continuing to receive and decode additional data blocks of the current message portion in response to the running tally being less than the stored error count; and
a stop element coupled to said comparison element for stopping reception and decoding of the additional data blocks of the current message portion in response to the running tally becoming equal to or greater than the stored error count.

13. The portable communication receiver of claim 12, further comprising a replacement element coupled to said comparison element for replacing the earlier received message portion corresponding to the one of the stored identifiers matching the received identifier, with the current message portion in response to the running tally for the current message portion in entirety being less than the stored error count.

14. The portable communication receiver of claim 12,
wherein each of the data blocks contains data bits and parity bits, and
wherein said computation element comprises a bit error count element for determining from the data bits and the parity bits of each of the data blocks a count of data bit errors in the data block.

15. The portable communication receiver of claim 12,
wherein the message portion includes a plurality of partial checksums, each partial checksum corresponding uniquely to one of the data blocks, and
wherein each partial checksum is compared to the data bits of the corresponding data block in accordance with the conventional error-detecting code utilized by the communication system to determine whether the data block contains errors, and
wherein said computation element comprises a block error count element for determining whether each of the data blocks is errored by comparing the data bits of the data block with the corresponding partial checksum.

* * * * *